(12) United States Patent
Gao

(10) Patent No.: US 11,137,876 B2
(45) Date of Patent: Oct. 5, 2021

(54) INFORMATION DISPLAY METHOD, DEVICE AND TERMINAL FOR DISPLAYING PROGRESS ON APPLICATION ICON

(71) Applicant: GUANGDONG OPPO MOBILE TELECOMMUNICATIONS CORP., LTD., Guangdong (CN)

(72) Inventor: Liang Gao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 76 days.

(21) Appl. No.: 16/500,522

(22) PCT Filed: Oct. 11, 2017

(86) PCT No.: PCT/CN2017/105754
§ 371 (c)(1),
(2) Date: Oct. 3, 2019

(87) PCT Pub. No.: WO2018/188289
PCT Pub. Date: Oct. 18, 2018

(65) Prior Publication Data
US 2020/0110529 A1    Apr. 9, 2020

(30) Foreign Application Priority Data
Apr. 10, 2017    (CN) .......................... 201710230178.9

(51) Int. Cl.
*G06F 3/0481*    (2013.01)
*G06F 3/0486*    (2013.01)
(Continued)

(52) U.S. Cl.
CPC ........ *G06F 3/04817* (2013.01); *G06F 3/0481* (2013.01); *G06F 3/0486* (2013.01);
(Continued)

(58) Field of Classification Search
CPC ........ G06F 3/0481; G06F 3/0486; G06F 8/65; G06F 8/61; G06F 9/451; G06F 11/328;
(Continued)

(56) References Cited

U.S. PATENT DOCUMENTS

| 5,301,348 A * | 4/1994 | Jaaskelainen ......... G06F 3/0481 345/469.1 |
| 7,954,064 B2 | 5/2011 | Forstall et al. |

(Continued)

FOREIGN PATENT DOCUMENTS

| CN | 106155748 | 11/2016 |
| CN | 106293696 | 1/2017 |

(Continued)

OTHER PUBLICATIONS

Duffy, "Storage Almost Full: How to Free Up Space on Your iPhone or iPad", PCMag.com Jun. 14, 2016, pp. 1-7 (Year: 2016).*

(Continued)

*Primary Examiner* — Andrew L Tank
(74) *Attorney, Agent, or Firm* — Hodgson Russ LLP

(57) ABSTRACT

The embodiment of the disclosure discloses an information display method, device and terminal. The method includes: a system application process creating a task of downloading or updating an application, acquiring relevant information of the application, and transmitting the relevant information of the application to a desktop process, wherein the relevant information of the application comprises a package name, an icon storage path, a downloading progress, and a downloading/installing status of the application; the desktop process acquiring an icon of the application based on the icon storage path, and displaying the icon of the application on a system desktop, displaying a translucent mask corresponding to the download progress of the application on an upper layer of the icon of the application; and displaying the (Continued)

downloading/installing status of the application around the icon of the application.

19 Claims, 11 Drawing Sheets

(51) Int. Cl.
    *G06F 8/65*            (2018.01)
    *G06F 11/32*          (2006.01)
    *G06F 8/61*            (2018.01)
    *H04M 1/72406*       (2021.01)
    *G06F 9/451*          (2018.01)

(52) U.S. Cl.
    CPC .............. *G06F 8/61* (2013.01); *G06F 8/65* (2013.01); *G06F 11/328* (2013.01); *G06F 9/451* (2018.02); *G06F 2203/04804* (2013.01); *H04M 1/72406* (2021.01)

(58) Field of Classification Search
    CPC ...... G06F 3/04817; G06F 2203/04804; H04M 1/72406
    See application file for complete search history.

(56) References Cited

U.S. PATENT DOCUMENTS

| | | | |
|---|---|---|---|
| 10,353,686 B1* | 7/2019 | Pasha | G06F 8/61 |
| 2008/0301672 A1* | 12/2008 | Rao | G06F 8/61 717/177 |
| 2012/0072871 A1* | 3/2012 | Seo | H04N 21/4316 715/838 |
| 2012/0096386 A1* | 4/2012 | Baumann | G06Q 30/0601 715/772 |
| 2013/0067064 A1* | 3/2013 | Thapar | G06Q 30/06 709/224 |
| 2013/0139095 A1* | 5/2013 | Li | G06F 3/1454 715/778 |
| 2013/0205217 A1* | 8/2013 | Schuller | G06F 16/168 715/739 |
| 2013/0332886 A1* | 12/2013 | Cranfill | G06F 3/04817 715/835 |
| 2013/0339942 A1* | 12/2013 | Brunsman | G06F 8/65 717/173 |
| 2014/0223423 A1* | 8/2014 | Alsina | G06F 8/65 717/173 |
| 2014/0250015 A1* | 9/2014 | Lemay | G06Q 30/0601 705/44 |
| 2014/0250433 A1* | 9/2014 | Stekkelpak | G06F 8/62 717/176 |
| 2014/0258936 A1* | 9/2014 | Lee | G06F 3/04817 715/835 |
| 2015/0277938 A1* | 10/2015 | Lu | G06F 9/451 717/168 |
| 2015/0296072 A1* | 10/2015 | Zhou | H04W 4/50 455/414.1 |
| 2015/0304440 A1* | 10/2015 | Zheng | H04L 67/26 717/177 |
| 2017/0003840 A1* | 1/2017 | Utsuki | G06F 3/0482 |
| 2017/0046024 A1* | 2/2017 | Dascola | G06F 3/0485 |
| 2017/0083303 A1 | 3/2017 | Meredith et al. | |
| 2017/0277400 A1* | 9/2017 | Lee | G06F 3/0482 |

FOREIGN PATENT DOCUMENTS

| | | |
|---|---|---|
| CN | 106970868 | 7/2017 |
| KR | 20120113535 | 10/2012 |
| KR | 20130053724 A * | 5/2013 |
| WO | WO 2015/000394 A1 * | 8/2015 |

OTHER PUBLICATIONS

Choi KR-20130053724-A, May 2013 Machine Translation, pp. 1-12 (Year: 2013).*
SIPO, First Office Action for CN Application No. 201710230178.9, dated Mar. 4, 2019.
SIPO, Second Office Action for CN Application No. 201710230178.9, dated May 17, 2019.
SIPO, Third Office Action for CN Application No. 201710230178.9, dated Nov. 20, 2019.
WIPO, ISR and WO for PCT/CN2017/105754, Dec. 14, 2017.
IPO, Office Action for IN Application No. 201917042640, dated Jul. 26, 2021.

* cited by examiner

INFORMATION DISPLAY METHOD, DEVICE AND TERMINAL FOR DISPLAYING PROGRESS ON APPLICATION ICON

CROSS-REFERENCE TO RELATED APPLICATIONS

This application is a U.S. national phase application of International Application No. PCT/CN2017/105754, filed Oct. 11, 2017, which claims priority to Chinese Patent Application No. 201710230178.9, filed Apr. 10, 2017, the entire disclosures of which are incorporated herein by reference.

TECHNICAL FIELD

The present disclosure relates to the field of mobiles technologies, and more particular, to an information display method, device and terminal.

BACKGROUND

App store is a system application for displaying and downloading application software for the terminal. When a user downloads an application from the app store, the app store displays information such as the download progress, the downloading/installing status of the application.

In the related art, after the user triggers to start downloading an application from the app store of the terminal, the app store creates a download task for the application, and displays the download progress and the downloading/installing status of the application in a download interface of the app store. The download progress refers to a percentage of the downloaded data to the total data that needs to be downloaded. The downloading/installing status refers to the application being in the downloading state or the installation state.

SUMMARY

An embodiment of the disclosure provides an information display method, device and terminal, with technical solutions as follows.

In a first aspect, an information display method is provided. The method comprises:
a system application process creating a task for downloading or updating an application;
the system application process acquiring relevant information of the application, wherein the relevant information of the application comprises a package name, an icon storage path, a downloading progress, and a downloading/installing status of the application;
the system application process transmitting the relevant information of the application to a desktop process;
the desktop process acquiring an icon of the application based on the icon storage path, and displaying the icon of the application on a system desktop;
the desktop process displaying a translucent mask corresponding to the download progress of the application on an upper layer of the icon of the application; and
the desktop process displaying the downloading/installing status of the application around the icon of the application.

In a second aspect, an information display method is provided. The method comprises:
acquiring relevant information of an application, wherein the relevant information of the application comprises an icon storage path, a downloading progress, and a downloading/installing status of the application;
acquiring an icon of the application based on the icon storage path, and displaying the icon of the application on a system desktop;
displaying a translucent mask corresponding to the download progress of the application on an upper layer of the icon of the application; and
displaying the downloading/installing status of the application around the icon of the application.

In a third aspect, an information display method is provided. The method comprises:
creating a task of downloading or updating an application;
acquiring relevant information of the application, wherein the relevant information of the application comprises a package name, an icon storage path, a downloading progress, and a downloading/installing status of the application;
transmitting the relevant information of the application to a desktop process, wherein the desktop process is configured to acquire the icon of the application based on the icon storage path, display the icon of the application on a system desktop, display a translucent mask corresponding to the download progress of the application on an upper layer of the icon of the application, and display the downloading/installing status of the application around the icon of the application.

In a fourth aspect, an information display device is provided. The device comprises:
an information acquiring module, configured to acquire relevant information of an application, wherein the relevant information of the application comprises an icon storage path, a downloading progress, and a downloading/installing status of the application;
an icon display module, configured to acquire an icon of the application based on the icon storage path and display the icon of the application on a system desktop;
a mask display module, configured to display a translucent mask corresponding to the download progress of the application on an upper layer of the icon of the application; and
a status display module, configured to display the downloading/installing status of the application around the icon of the application.

In a fifth aspect, an information display device is provided. The device comprises: a task creating module, configured to create a task for downloading or updating an application; a relevant information acquiring module, configured to acquire relevant information of the application, wherein the relevant information of the application comprises a package name, an icon storage path, a downloading progress, and a downloading/installing status of the application; a relevant information transmitting module, configured to transmitting the relevant information of the application to a desktop process, wherein the desktop process is configured to acquire the icon of the application based on the icon storage path, display the icon of the application on a system desktop, display a translucent mask corresponding to the download progress of the application on an upper layer of the icon of the application, and display the downloading/installing status of the application around the icon of the application.

In a sixth aspect, a terminal is provided. The terminal comprises:
one or more processors; and
a memory;
wherein the memory has one or more programs stored therein, the one or more programs are configured to be executed by the one or more processors, the one or more programs comprises instructions for performing the operations of:

acquiring relevant information of an application, wherein the relevant information of the application comprises an icon storage path, a downloading progress, and a downloading/installing status of the application;

acquiring an icon of the application based on the icon storage path, and displaying the icon of the application on a system desktop;

displaying a translucent mask corresponding to the download progress of the application on an upper layer of the icon of the application; and displaying the downloading/installing status of the application around the icon of the application.

In a seventh aspect, a computer readable storage medium is provided. The computer readable storage medium has at least one instruction stored therein, the at least one instruction is loaded by a processor and executed to implement the information display method as described in the second aspect.

DETAILED DESCRIPTION

In order to make the objects, technical solutions and advantages of the disclosure clearer, the embodiments of the disclosure will be further described in detail below with reference to the accompanying drawings.

In the related art, a download progress and a downloading/installing status about an application are just displayed in a download interface of an app store, when a user exits the app store, the download progress and the downloading/installing status of the application cannot be found. If the user wants to find the download progress and the downloading/installing status of the application again after exiting the app store, the user needs to enter the download interface of the app store again through many operation steps, which is cumbersome.

In the embodiment of the disclosure, the download progress and the downloading/installing status of the application are displayed on a system desktop to achieve the purpose of facilitating viewing and simplifying operations. The system desktop is a main screen area for users viewing when a terminal is powered on and an operating system is started. The system desktop is simply referred to as "desktop". The system desktop is a user interface for the user to interact with the terminal, and the user can open applications or folders on the system desktop.

In the method provided in the embodiments of the disclosure, an execution subject of each step may be a terminal. For example, the terminal may be an electronic device such as a mobile phone, a tablet, an e-book reader, a multimedia playback device, a Personal Digital Assistant (PDA), a wearable device, or the like. In one embodiment, the terminal is a mobile terminal based on an Android operating system. Of course, the operating system of the disclosure is not limited thereto, and may be other operating systems such as an iOS operating system, a Windows Phone operating system or the like.

The embodiments of the disclosure are further described in detail below based on the related common aspects thereof.

Figure 1A:
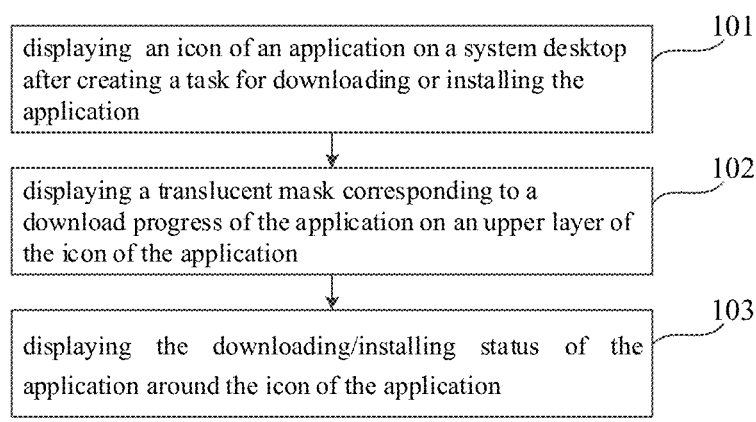
FIG. 1A is a flowchart of an information display method according to an embodiment of the disclosure.

Please refer to FIG. 1A, which is a flowchart of an information display method provided by an embodiment of the disclosure. The method can include the following steps.

Step 101, after creating a task of downloading or installing an application, an icon of the application is displayed on a system desktop.

The task of downloading an application refers to a task created in a system application for downloading the application. The task of installing an application refers to a task created in the system application to install the application. The above system application refers to the application for displaying and downloading application software applicable to the terminal, and such a system application may be referred to as a system distributed application. For example, the system distributed application may be a software store, an app store, a game center, or the like. In actual applications, the system distributed application may have different names.

For one terminal, one or more system distributed applications can be installed and operated in the terminal. For example, the terminal can just have one system distributed application installed and operated therein, with the name of "software store". For another example, the terminal can have two system distributed applications installed and operated therein, with the names of "software store" and "game center". The application, named as "software store", is used to provide download functions for all types of applications, including games, education, shopping, music, video, social, navigation and other different types of applications. The application, named as "game center", is configured for downloading applications dedicated to providing games.

After the system distributed application creates the task of downloading or installing the application, the terminal obtains the icon of the application and displays it on the system desktop.

Step 102, a translucent mask corresponding to the download progress of the application is displayed on an upper layer of the icon of the application.

The translucent mask refers to a translucent covering layer. In the embodiment of the disclosure, the covering layer floats and covers the upper of the icon in the system desktop. The translucent mask is used to show the download progress of the application. A transparency of the translucent mask is greater than 0 and less than 1. For example, the transparency of the translucent mask is 20%, 50% or 70%, etc., which can be preset according to actual needs and interface effects. In the embodiment of the disclosure, the shape and the maximum size of the translucent mask are not limited. For example, the shape of the translucent mask can be rectangular, rounded rectangular, circular, starlike, etc., and the maximum size of the translucent mask may be the same as that of the icon of the application, or may be smaller or greater than that of the icon of the application. In one embodiment, the shape of the translucent mask is the same as that of the icon it covers (e.g., the icon of an application or a desktop folder), the maximum size of the translucent mask is the same as that of the icon it covers (e.g., the icon of an application or a desktop folder). For example, when there are icons of different shapes on the system desktop, the shapes of the respective translucent masks displayed on the icons are also different, for example, the translucent mask displayed on a rounded rectangular icon is rounded rectangular in shape, the translucent mask displayed on a circular icon is circular in shape. In some embodiments, specific display configurations for icons of applications and translucent masks can be seen in FIGS. 1B-1F below.

In the embodiment of the disclosure, by displaying the translucent mask in a semi-transparent form and covering the upper layer of the application icon, it is ensured that the user can simultaneously view the translucent mask and the complete icon of the application, so that the user can clearly understand that which application is being downloaded and how the download progress runs.

In one embodiment, the step 102 includes the following sub-steps.

Sub-step 102a, an area of the translucent mask is determined according to the download progress of the application.

The download progress of the application is the percentage of the downloaded data of the application to the total amount of data that needs to be downloaded. The area of the translucent mask is inversely related to the download progress of the application. That is, the larger the download progress of the application, the smaller the area of the translucent mask; the less the download progress of the application, the larger the area of the translucent mask.

When the download progress of the application is 0%, the area of the translucent mask is equal to the area of the icon of the application. When the download progress of the application is 100%, the area of the translucent mask is a % of the area of the icon, where 0<a<100. The value of a can be obtained according to actual experience, for example, a=20. A reduction rate of the area of the translucent mask can be linearly or non-linearly related to a growth rate of the download progress of the application. Assuming a=20, the reduction rate of the area of the translucent mask is linearly related with the growth rate of the download progress of the application, the download progress of the application is x %, and the area of the translucent mask is y % of the area of the icon of the application, then, y=(ax/100)−x+100, 0<x<100. For example, when x=40, y=68; when x=50, y=60; when x=60, y=52. For example, during the process that the download progress of the application increases from 0% to 25%, the ratio of the area of the translucent mask to the area of the icon of the application is reduced from 100% to 80%. For another example, during the process that the download progress of the application increases from 50% to 75%, the ratio of the area of the translucent mask to the area of the icon of the application is reduced from 60% to 40%.

Sub-step 102b, the translucent mask is displayed on the upper layer of the icon of the application according to the area of the translucent mask.

Thus, as the download progress of the application increases, the area of the translucent mask gradually decreases.

The translucent mask can be gradually reduced from bottom to top of the icon, or it can be gradually reduced from top to bottom of the icon, or it can be gradually reduced from right to left of the icon, or from the left to right of the icon. It is not limited in the embodiment of the disclosure.

Step 103, the downloading/installing status of the application is displayed around the icon of the application.

The terminal also displays the downloading/installing status of the application at a periphery of the icon of the application. The periphery of the icon can be any position selected from the lower, the upper, the left, the right, the upper left corner, the upper right corner, the lower left corner, the lower right corner, and the central of the icon. In one embodiment, the periphery of the icon is the lower thereof, and the terminal displays the downloading/installing status of the application below the icon. In one embodiment, the terminal displays the downloading/installing status of the application below the icon, specifically at the location that used to display the name of the application.

The downloading/installing status of the application is configured to indicate the stage in which the application is downloaded or installed. The downloading/installing status includes any one of waiting for download, downloading in progress, suspending download, installing in progress, and completing installation. In one embodiment, when the downloading/installing status is one of waiting for download, downloading in progress, suspending download or installing in progress, the terminal displays the downloading/installing status below the icon where used to display the name of the application, meanwhile the name of the application is not displayed. When the downloading/installing status is completing installation, the terminal displays the downloading/installing status below the icon where used to display the name of the application, meanwhile the name of the application is displayed.

In the embodiment of the disclosure, there is no limitation on the display form of the downloading/installing status. For example, the downloading/installing status can be displayed in text, and different status can be expressed in different texts, such as "waiting" indicates waiting for download, "downloading" indicates downloading in progress, "installing" indicates installing in progress, and "suspending" indicates suspending download, etc. For another example, the downloading/installing status can also be displayed in the form of markers, and different status can be expressed in different markers, such as graphic markers of circles, triangles, stars and the like. When the status is displayed in the form of text, it is more intuitive and easier for users to accept.

In one embodiment, when the downloading/installing status is installing in progress, the translucent mask of a preset size is displayed on the upper layer of the icon of the application, and the area of the translucent mask of the preset size is a % of the area of the icon of the application; when the downloading/installing status is completing installation, the area of the translucent mask is controlled to be reduced from a % to zero. For example, a=20, when the status is installing in progress, the area of the translucent mask displayed on the upper layer of the icon of the application is 20% of the area of the icon, when the status is completing installation, the area of the translucent mask is controlled to be reduced from 20% to zero. For another example, a=25, when the status is installing in progress, the area of the translucent mask displayed on the upper layer of the icon of the application is 25% of the area of the icon, when the status is completing installation, the area of the translucent mask is controlled to be reduced from 25% to zero. In addition, the reduction rate at which the area of the translucent mask is reduced from a % to 0 (or time consuming) can be set according to actual experience, for example, 2 seconds, 1 second, or 0.5 second.

Referring to FIGS. 1B to 1F, schematic diagrams of different downloading/installing status are shown.

Figure 1B:
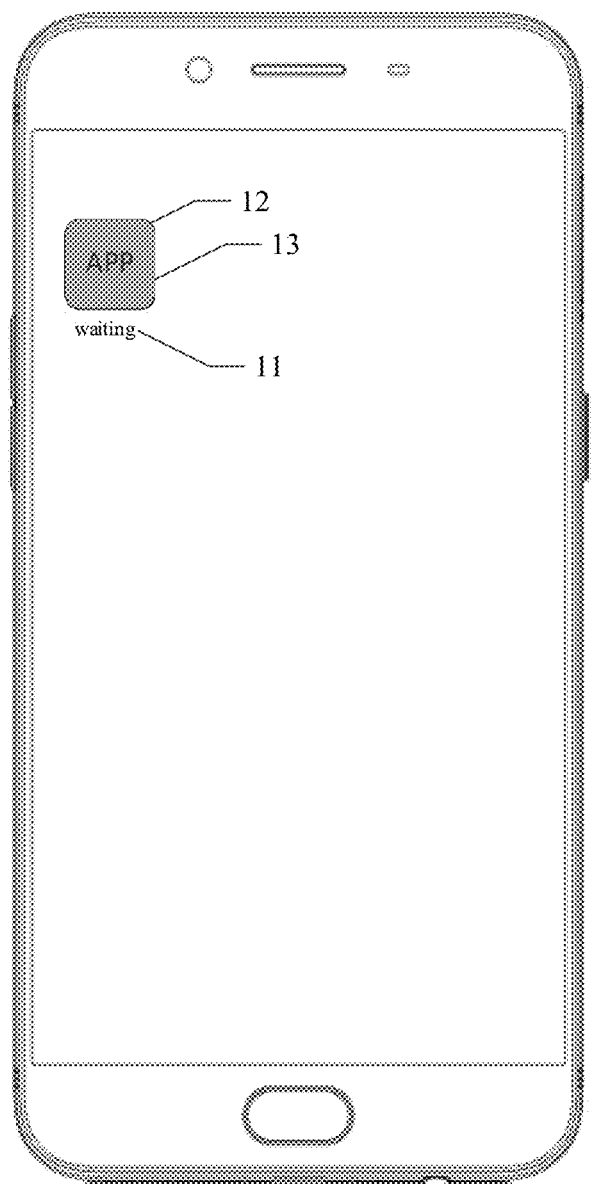
FIG. 1B to 1F are schematic diagrams showing application icons in different downloading/installing status.

As shown in FIG. 1B, the downloading/installing status of the application is waiting for download, "waiting" is adopted to indicate waiting for download, and "waiting" is displayed at the location 11 used for displaying the name of the application. When the download progress of the application is 0%, the area of the translucent mask 12 is equal to the area of the icon 13 of the application.

Figure 1C:
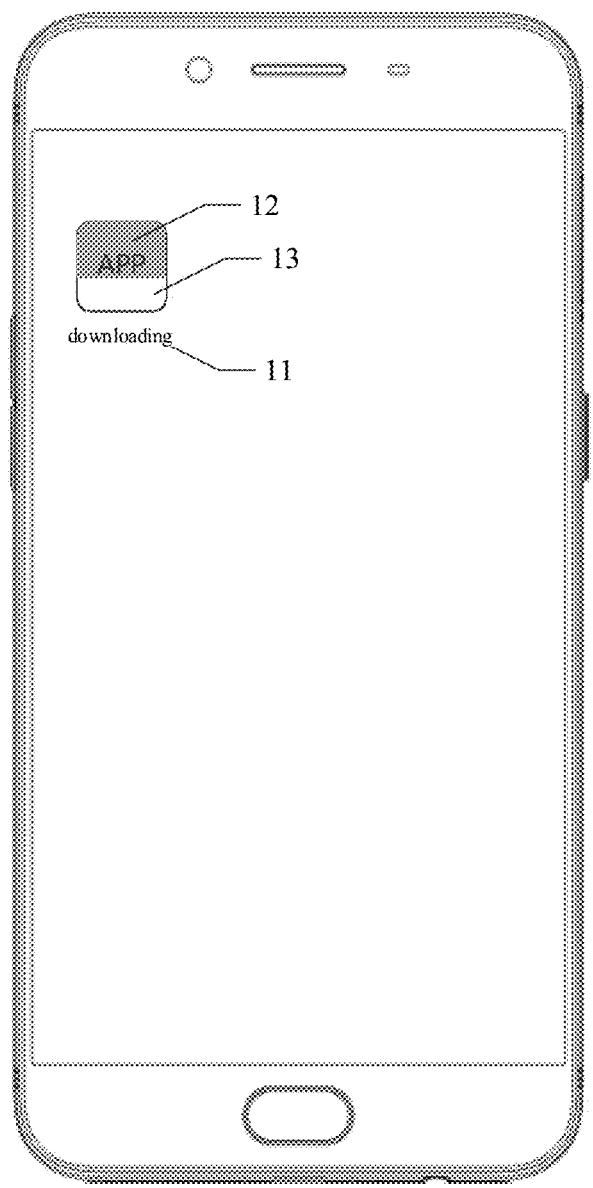

As shown in FIG. 1C, the downloading/installing status of the application is downloading in progress, "downloading" is adopted to indicate downloading in progress, and "downloading" is displayed at the location 11 used for displaying the name of the application. At this time, the area of the translucent mask 12 is determined according to the download progress of the application, and the translucent mask 12 is displayed on the upper layer of the icon 13 of the application.

Figure 1D:
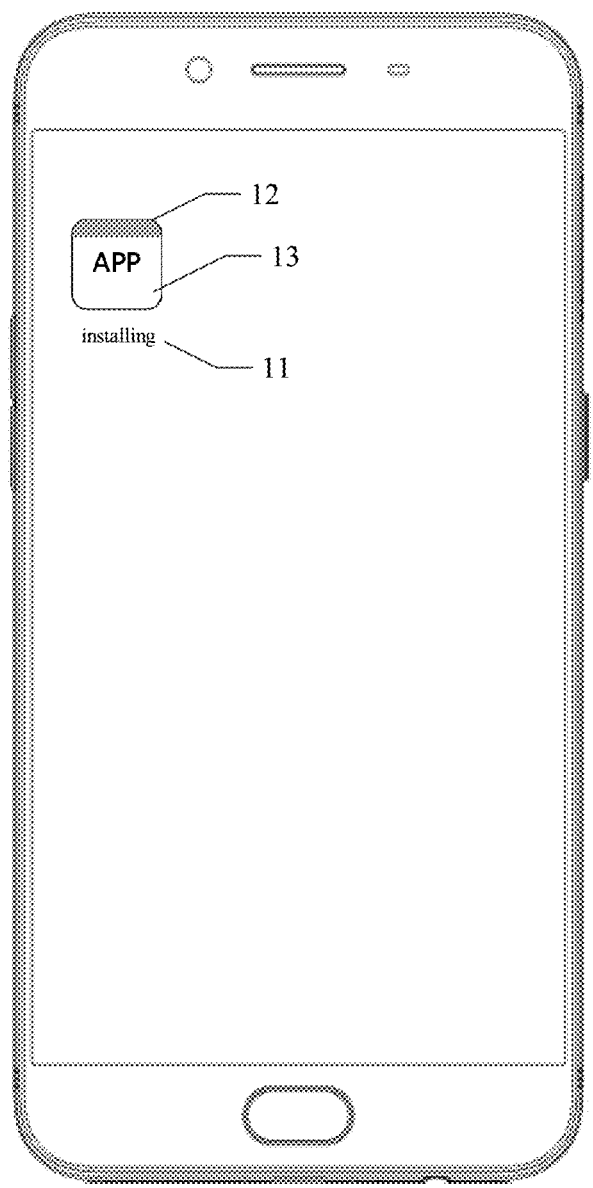

As shown in FIG. 1D, the downloading/installing status of the application is installing in progress, "installing" is used to indicate that it is being installed, and "installing" is displayed at the location 11 used for displaying the name of the application. Taking a=20 as an example, the download progress of the application is 100% at this time, and the area of the translucent mask 12 is 20% of the area of the icon 13 of the application.

Figure 1E:
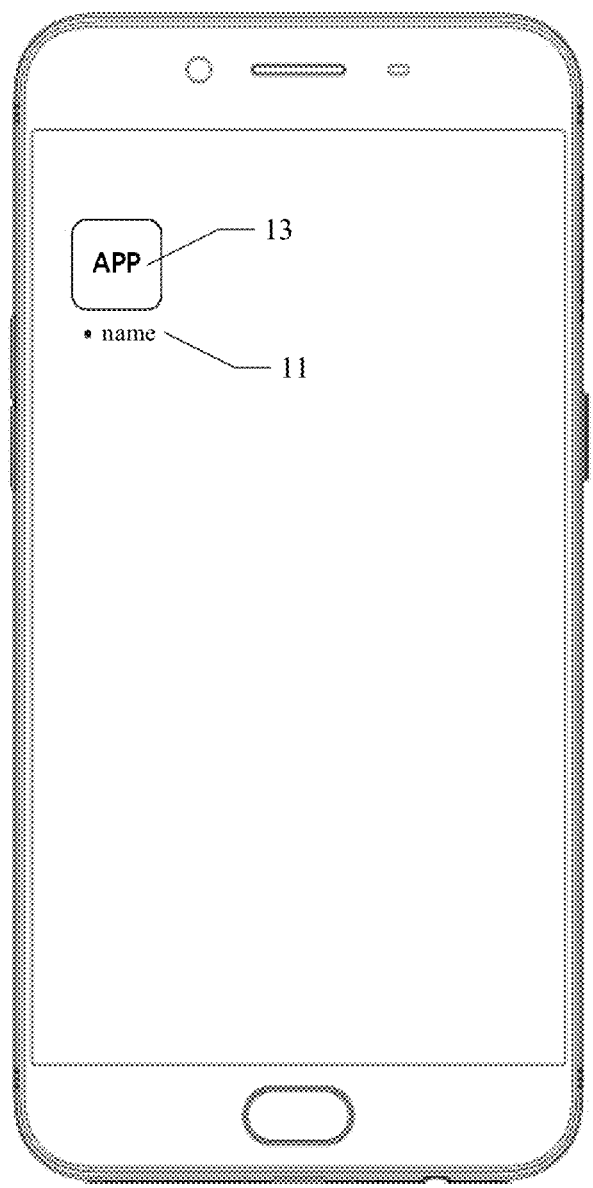

As shown in FIG. 1E, the downloading/installing status of the application is completing installation, at this time, the name of the application is displayed at the location 11, and a small dot is displayed on the left of the name of the application to indicate that the status is completing installation, and the translucent mask on the icon 13 has been completely faded.

Figure 1F:
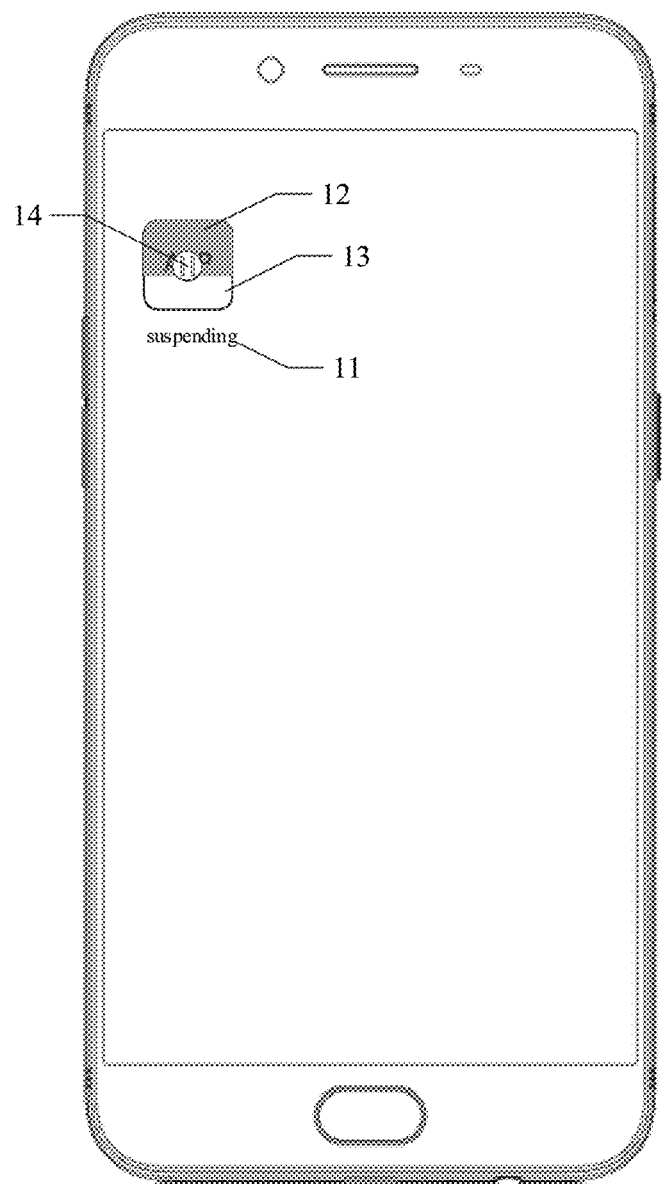

As shown in FIG. 1F, the downloading/installing status of the application is suspending download, "suspending" is used to indicate that the download is paused, and "suspending" is displayed at the location 11 used for displaying the name of the application. At this time, the area of the translucent mask 12 is determined according to the download progress of the application, and it is displayed on the upper layer of the icon 13 of the application.

In one embodiment, the method provided by the disclosure further includes the following steps.

1. When the downloading/installing status of the application is downloading in progress, if a first operation signal corresponding to the icon of the application is acquired, the download of the application is suspended. The downloading/installing status of the application is changed from downloading in progress to suspending download, a startup download control is displayed on an upper layer of the translucent mask, and the startup download control refers to an operation control for triggering the startup of the download about the application.

In the embodiment of the disclosure, the triggering manner of the first operation signal is not limited, for example, by a click operation, a sliding operation, and/or a pressing operation. Taking the click operation as an example, when the downloading/installing status of the application is downloading in progress, as shown in FIG. 1C, the user clicks the icon 13 of the application to trigger the suspending of the download, and the status displayed by the terminal is changed from FIG. 1C to FIG. 1F. The startup download control 14 is displayed on the upper layer of the translucent mask 12.

2. When the downloading/installing status of the application is suspending download, if a second operation signal corresponding to the startup download control is acquired, the download of the application is started, and the status displayed is changed from suspending download to downloading in progress.

In the embodiment of the disclosure, the triggering manner of the second operation signal is not limited, for example, by a click operation, a sliding operation, and/or a pressing operation. Taking the click operation as an example, when the downloading/installing status of the application is suspending download, as shown in FIG. 1F, the user clicks the startup download control 14 to trigger the download of the application, and the status displayed by the terminal is changed from FIG. 1F to FIG. 1C.

In one embodiment, it is considered that, after the user restarts the download by triggering the suspended application, the application may not be able to start the download immediately, and needs to wait for the download in a download queue. Therefore, when the downloading/installing status of the application is suspending download as shown in FIG. 1F, the user clicks the start download control 14 to trigger the download of the application, and the status displayed on the terminal is changed from FIG. 1F to FIG. 1B. Then, if the application can continue to download, the status displayed on the terminal is changed from FIG. 1B to FIG. 1C after beginning the download; if the application cannot continue to download, the status displayed by the terminal is changed from FIG. 1B to FIG. 1F.

In addition, when downloading/installing status of the application is installing in progress, the icon of the application does not respond to the click operation corresponding to the icon of the application.

It should be noted that, in the embodiment of the disclosure, an executing order of the foregoing steps 102 and 103 is not limited, and the step 103 may be performed after the step 102, before the step 102, or simultaneously with the step 102.

In summary, the embodiment of the disclosure displays the download progress and the downloading/installing status of the application on the system desktop thereby achieving the technical effects of facilitating viewing and simplifying operations, by: displaying the icon of the application after creating a task of downloading or installing the application, displaying the translucent mask corresponding to the download progress of the application on the upper layer of the icon, and displaying the downloading/installing status of the application around the icon.

In addition, the mask used to show the download progress of the application is semi-transparent, it ensures that the user can watch the mask and the complete icon of the application at the same time, so that the user can clearly associate the application and its download progress.

Figure 2:
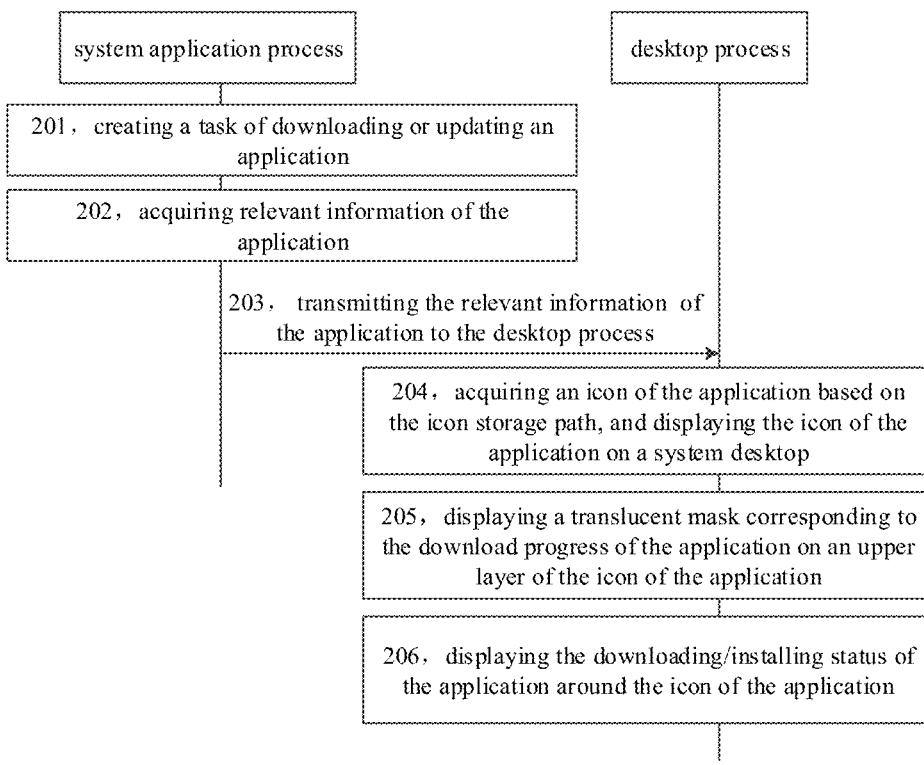
FIG. 2 is a flowchart of an information display method according to another embodiment of the disclosure.

The terminal has system application processes and desktop processes operated therein. The system application processes refer to the processes of the system distributed application described above. The desktop processes refer to the processes of the system desktop described above. As shown in FIG. 2, the system application processes and the desktop processes perform the following interactions to display the download progress and the downloading/installing status of the application on the system desktop.

Step 201, the system application process creates a task for downloading or installing an application.

If the application's download package is downloaded through the system application process, the system application process creates a task for downloading the application. If the application's installation package is installed through the system application, the system application process creates a task for installing the application.

In addition, if the application is installed through a local installation package, the system application process or an application installation process creates a task for installing the application. The above-mentioned local installation package refers to an installation package of the application stored in a local memory of the terminal, which has been acquired by downloading from the network, synchronizing from other devices, or receiving from other devices. The application installation process is a system process that is dedicated to install applications.

Step 202, the system application process acquires relevant information of the application.

The relevant information of the application includes: the package name of the application, the icon storage path of the application, the download progress of the application, and the downloading/installing status of the application. The package name of the application refers to the name of the installation package of the application. The icon storage path of the application refers to the storage address of the icon of the application stored on the terminal, which can be represented by a file path. For example, the application's icon storage path is: file:///data/user/0/com.xiaomi.market/cache/ab2f64724930ee039. The download progress of the application is the percentage of the downloaded data to the total amount of data that needs to be downloaded. The downloading/installing status of the application includes any one of waiting for download, downloading in progress, suspending download, installing in progress, and completing installation.

In one embodiment, the relevant information of the application further includes a source of the application. The source of the application is configured to indicate where the application was acquired. For example, the source of the application includes any one of a software store, a game center, and a local installation package.

Illustratively, the relevant information of the application is shown in Table-1 below:

TABLE 1

| packageName | source | icon | status | progress |
| --- | --- | --- | --- | --- |

Where "packageName" indicates the name of the package of the application, "source" indicates the source of the application, "icon" indicates the icon storage path of the application, "status" indicates the downloading/installing status of the application, and "progress" indicates the download progress of the application. In one embodiment, "status" may be represented by int type data, for example, 0, 1, 2 and 3 can be used to indicate waiting for download, downloading in progress, suspending download, and installing in progress, respectively, and completing installation may be represented by an invalid value (e.g., −1).

It should be noted that if the task for downloading the application is created, the relevant information of the application includes the download progress of the application; if the task for installing the application is created, the relevant information of the application may include or exclude the download progress (for example, 100%) of the application.

Step 203, the system application process transmits the relevant information of the application to the desktop process.

Correspondingly, the desktop process receives the relevant information of the application transmitted from the system application process.

In one embodiment, the system application process writes the relevant information of the application in a desktop database, and the desktop process reads the relevant information of the application from the desktop database.

The desktop database is configured to store the relevant information of the application. In the Android system, the desktop database is a launcher database, which is represented by launcher.db. The launcher database stores data in the form of tables, which can be called as singledesktopitems tables. In the singledesktopitems table, the fields "source", "status", and "progress" can be added to store the source of the application, the downloading/installing status of the application, and the download progress of the application, respectively.

The icon storage path of the application can be stored in the original conResource field of the singledesktopitems table. In one embodiment, the singledesktopitems table further includes the field of iconType, and the value of the iconType field is set to 100, indicating that the icon of the application needs to be read from the icon storage path given by the iconResoure field. In another embodiment, the singleTabletopitems table further includes the field of itemType. When the value of the itemType field is set to 100, it indicates that the application is being downloaded and has not been installed in the terminal. When the value of the itemType field is set to 101, the application is being download and has been already installed in the terminal. That is, two different values are used to indicate whether downloading a new application or updating a downloaded application.

In the Android system, ContentProvider provides a unified interface for storing and reading data. The system application process can write the relevant information of the application into the desktop database through the interface provided by the ContentProvider, and the desktop process can read the relevant information of the application from the desktop database through the interface provided by the ContentProvider.

The method of writing the desktop database is adopted to realize the communication between the system application process and the desktop process, thereby achieving the operations of querying, modifying, adding and deleting data and realizing the sharing of data between processes.

In another embodiment, the system application process transmits the relevant information of the application to the desktop process in a broadcast manner.

In the Android system, a broadcast mechanism is also provided. Therefore, the system application process can send the relevant information of the application to the desktop process via a broadcast manner.

When the manner of broadcasting is adopted to realize the communication between the system application process and the desktop process, compared with other communication methods, there may be some instability and delay, but the propagation range is wide, and the system application process can also transmit data to the other processes besides the desktop process, thereby improving the function expansion.

Step 204, the desktop process acquires the icon of the application according to the icon storage path of the application, and displays the icon of the application on the desktop.

In one embodiment, when the system application process transmitting the relevant information of the application to the desktop process, the icon storage path of the application may be preferentially transmitted, so that the desktop process can obtain the icon of the application more quickly.

Figure 3:
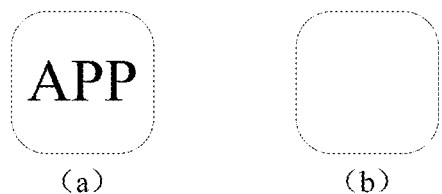
FIG. 3 is a schematic diagram showing an application icon and a virtual icon.

In one embodiment, if the desktop process acquires the icon of the application according to the icon storage path of the application within a preset time, the desktop process displays the icon of the acquired application on the system desktop. If the desktop process fails to obtain the icon of the application according to the icon storage path of the application within the preset time, the desktop process displays a preset virtual icon on the system desktop, and the preset virtual icon is used to replace the unacquired icon of the application. The preset time can be set according to actual experience, for example, 50 milliseconds. The preset virtual icon refers to, for example, a preset icon with boundaries and without content therein. Illustratively, as shown in FIG. 3, part (a) of FIG. 3 shows an icon of an application, and part (b) of FIG. 3 shows a virtual icon.

In addition, if the desktop process displays the preset virtual icon on the system desktop, after the desktop process obtains the icon of the application according to the icon storage path of the application, the preset virtual icon is replaced with the icon of the application.

Step 205, the desktop process displays a translucent mask corresponding to the download progress of the application on an upper layer of the icon of the application.

The translucent mask refers to a semi-transparent covering layer. In the embodiment of the disclosure, the covering layer is disposed on the upper layer of the icon of the system desktop. The translucent mask is configured to showing the downloading progress of the application. By displaying the translucent mask in a semi-transparent form, it is ensured that the user can simultaneously view the translucent mask and the complete icon of the application, so that the user can clearly understand that which application is being downloaded and how the download progress runs.

In one embodiment, the step 205 includes the following sub-steps.

Sub-step 205a, the desktop process determines an area of the translucent mask according to the download progress of the application.

The area of the translucent mask is inversely related to the download progress of the application. When the download progress of the application is 0%, the area of the translucent mask is equal to the area of the icon of the application. When the download progress of the application is 100%, the area of the translucent mask is a % of the area of the icon, where 0<a<100. The value of a can be obtained according to actual experience, for example, a=25.

Sub-step 205b, the desktop process displays the translucent mask on the upper layer of the icon of the application according to the area of the translucent mask.

Thus, as the download progress of the application increases, the area of the translucent mask gradually decreases.

The translucent mask can be gradually reduced from bottom to top of the icon, or it can be gradually reduced from top to bottom of the icon, or it can be gradually reduced from right to left of the icon, or from the left to right of the icon. It is not limited in the embodiment of the disclosure.

In addition, during the downloading process, the system application process sends the download progress of the application to the desktop process every first interval. In practical applications, the first interval takes a small value, for example, 20 milliseconds, and substantially achieves the effect of real-time synchronizing the download progress. After the desktop process obtains the latest download progress of the application sent by the system application process, the translucent mask above the icon of the display application is refreshed. Thus, the animation refresh interval of the translucent mask is also the first interval, and when the first interval is about 20 milliseconds, the refresh frequency can be reduced as much as possible while ensuring the visual effect.

Step 206, the desktop process displays the downloading/installing status of the application around the icon of the application.

In one embodiment, the terminal displays the downloading/installing status of the application below the icon, specifically at the location that used to display the name of the application. For the description of the downloading/installing status of the application, it can be referred to the embodiment of FIG. 1A, which is not described detail in this embodiment.

In one embodiment, when the downloading/installing status is installing in progress, the translucent mask of a preset size is displayed on the upper layer of the icon of the application, and the area of the translucent mask of the preset size is a % of the area of the icon of the application; when the downloading/installing status is completing installation, the area of the translucent mask is controlled to be reduced from a % to zero.

Figure 4:
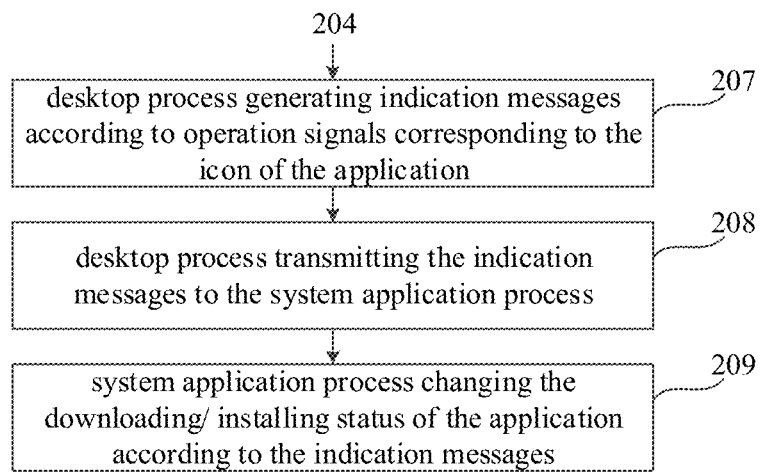
FIG. 4 is a flowchart of an information display method according to still another embodiment of the disclosure.

In one embodiment, as shown in FIG. 4, the method further comprises the following steps after the foregoing step 204.

Step 207, the desktop process generates indication information according to operation signals corresponding to the icon of the application.

The indication information is used to instruct the system application process to change the downloading/installing status of the application.

In one embodiment, when the downloading/installing status of the application is downloading in progress, if the desktop process acquires a first operation signal corresponding to the icon of the application, the desktop process generates a suspending indication message, which is used to instruct that the download of the application is suspended. In the above manner, the download of the application can be suspended by triggering the icon of the application on the system desktop, without entering a relevant interface of the system distributed application, thereby simplifying the operations of suspending the download of the application.

In one embodiment, when the downloading/installing status of the application is suspending download, if the desktop process acquires a second operation signal corresponding to the icon of the application, the desktop process generates a startup indication message, which is configured to instruct that the download of the application is started. In the above manner, the download of the application can be started by triggering the icon of the application on the system desktop, without entering a relevant interface of the system distributed application, thereby simplifying the operations of suspending the download of the application.

In one embodiment, when the application does not complete the download (the downloading/installing status of the application is waiting for download, downloading in progress, or suspending download), if the desktop process acquires a delete operation signal corresponding to the icon of the application, the desktop process generates a cancel indication message, which is configured to cancel the download of the application. In the above manner, the download of the application can be cancelled by triggering the icon of the application on the system desktop, without entering a relevant interface of the system distributed application, thereby simplifying the operations of suspending the download of the application.

In the embodiment of the disclosure, the triggering manner of delete operation signal is not limited, for example, long press the system desktop triggers to enter an icon editing mode, in which a delete control is displayed at the upper right corner of the icon of the application, and the delete operation signal can be trigged by clicking the delete control. In addition, when the application has been downloaded (the downloading/installing status of the application is installing in progress), in the icon editing mode, the desktop process does not display the delete control in the upper right corner of the icon of the application, and the icon of the application cannot be deleted.

Step 208, the desktop process transmits the indication information to the system application process.

Correspondingly, the system application process receives the indication information transmitted from the desktop process.

In one embodiment, the desktop process invokes a preset interface provided by the system application process, and sends the indication information to the system application process through the preset interface.

In the Android system, Android Interface Definition Language (AIDL) is provided, and a communication interface between Android processes can be defined through AIDL to realize communications therebetween.

The communication between the desktop process and the system application process via AIDL has the advantages of high speed, stable performance and high efficiency.

In one embodiment, the desktop process transmits the indication information to the system application process via a broadcast manner.

In the Android system, a broadcast mechanism is also provided. Therefore, the desktop process can send indication information to the system application process via a broadcast manner.

The communication between the desktop process and the system application process via the broadcast manner, has the advantage of wide spread range, and the desktop process can also send data to other processes besides the system application process, which is helpful for function expansion.

Step 209, the system application process changes the downloading/installing status of the application according to the indication information.

If the system application process receives the suspending indication information, the system application process pauses to download the application (also the task for downloading the application is suspended), and changes the status from downloading in progress to suspending download, and sends the changed status to the desktop process. Correspondingly, after the desktop process receives the changed status, the changed status is displayed around the icon of the application.

If the system application process receives the startup indication information, the system application process starts the download of the application (also the task for downloading the application is restored), and changes the status from suspending download to downloading in progress, and sends the changed status to the desktop process. Correspondingly, after the desktop process receives the changed status, the changed status is displayed around the icon of the application.

If the system application process receives the cancel indication information, the system application process cancels the download of the application (i.e., the task for downloading the application is deleted), and sends a respond that cancel the download to the desktop process. Correspondingly, after the desktop process receives the cancel indication information, the icon of the application is deleted from the system desktop.

In summary, in the embodiment of the disclosure, a reliable communication mechanism between the system application process and the desktop process is provided, so that when any one of the system application process and the desktop process changes the status of the application, it can promptly notify the other one to respond to the changes of the status, thereby fully ensuring that the data is synchronized and displayed correctly.

In one embodiment, when the terminal detects that a currently accessed network is a mobile data network, the terminal displays a first popup window on the system desktop. The mobile data network refers to the network provided by an operator that is different from a wireless local area network. Under normal circumstances, the terminal uses the mobile data network to send and receive data, which consumes the network flow and costs charges. The terminal uses a wireless local area network (such as a Wi-Fi network) to send and receive data always without consuming the network flow. In order to avoid the problem of consuming network flow by using the mobile data network to download the application, in the embodiment of the disclosure, when the system application process detects that the currently accessed network is the mobile data network, transmit a first popup window indication to the desktop process. The desktop process displays the first popup window on the system desktop according to the first popup window indication. The first popup window includes a first prompt information, a first operation control, and a second operation control. The first prompt information is configured to remind that the currently accessed network is a mobile data network, the first operation control is configured to trigger the download of the application through the mobile data network, and the second operation control is configured to trigger the download of the application when accessing the wireless local area network.

In one embodiment, when the terminal detects that a remaining storage space is insufficient, the terminal displays a second popup window on the system desktop. The remaining storage space refers to the remaining storage resources available to the terminal. In order to avoid the problem that the application cannot complete the download due to insufficient storage space, in the embodiment of the disclosure, when the system application process detects that the remaining storage space is insufficient, transmits a second popup window indication to the desktop process, and the desktop process displays a second popup window on the system desktop according to the second popup window indication. The second popup window includes a second prompt information, a third operation control, and a fourth operation control. The second prompt information is configured to remind that the remaining storage space is insufficient, the third operation control is configured to trigger the cleaning of the storage space, and the fourth operation control is configured to trigger the cancellation of the cleaning of the storage space.

Figure 5:
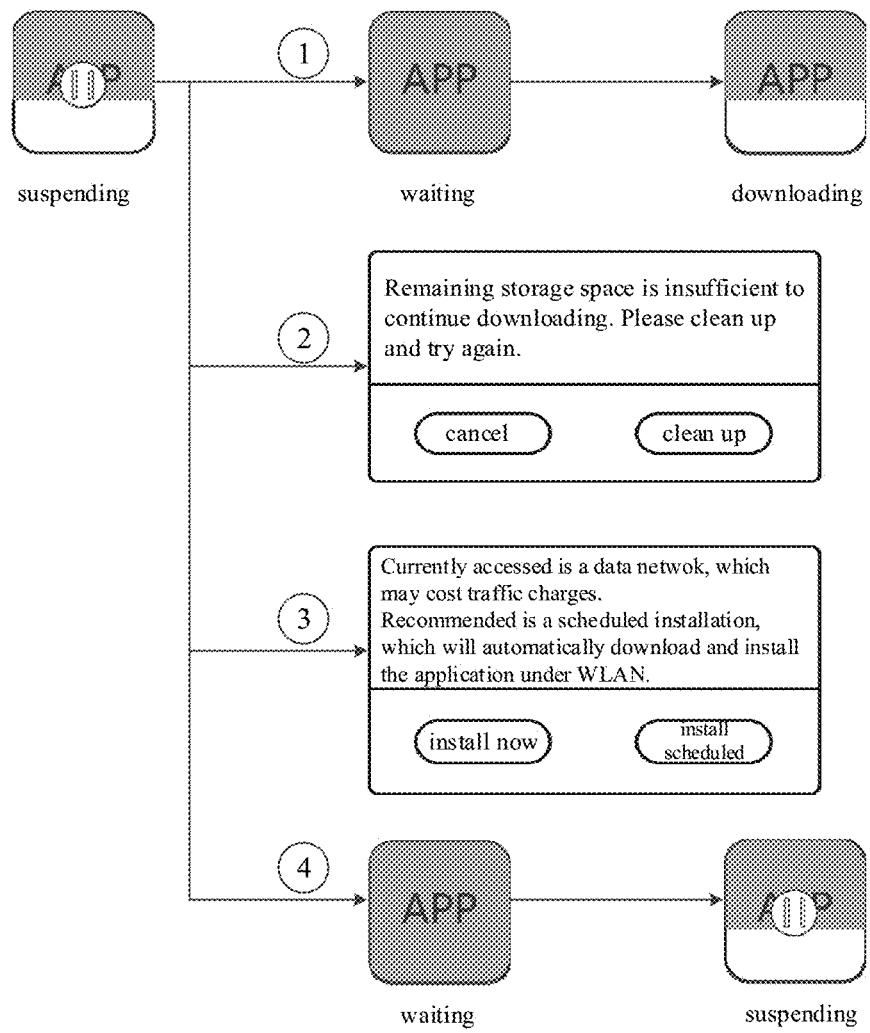
FIG. 5 is a schematic diagram showing an interface after a suspended application is restarted to download.

In one embodiment, referring to FIG. 5, it is assumed that the downloading/installing status of the application is suspending download, after the user triggers the download of the application, the desktop process sends a startup indication message to the system application process, and feedback information of the system application process to the desktop process has the following several possible situations.

1. If the feedback information of the system application process is directly to join the download queue, the desktop process changes the status of the application from suspending download to waiting for download. When it is the turn of the application to download, the desktop process changes the status of the application from waiting for download to downloading in progress.

2. If the feedback information of the system application process is the first prompt information introduced above, the desktop process displays the first popup window on the desktop, and asks the user whether to continue the download or not. When the user chooses to continue the download, the desktop process returns the result to the system application process and changes the status of the application from suspending download to waiting for download.

3. If the feedback information of the system application process is the second prompt information introduced above, the desktop process displays the second popup window on the desktop, and prompts the user that the remaining storage space is insufficient, and the desktop process does not change the status of the application. The user can trigger to clear the storage space through the third operation control.

4. If the feedback information of the system application process is no network or other reasons causing that cannot join the download queue, the desktop process first changes the status of the application from suspending download to waiting for download, and then automatically changes the status from waiting for download to suspending download.

Figure 6:
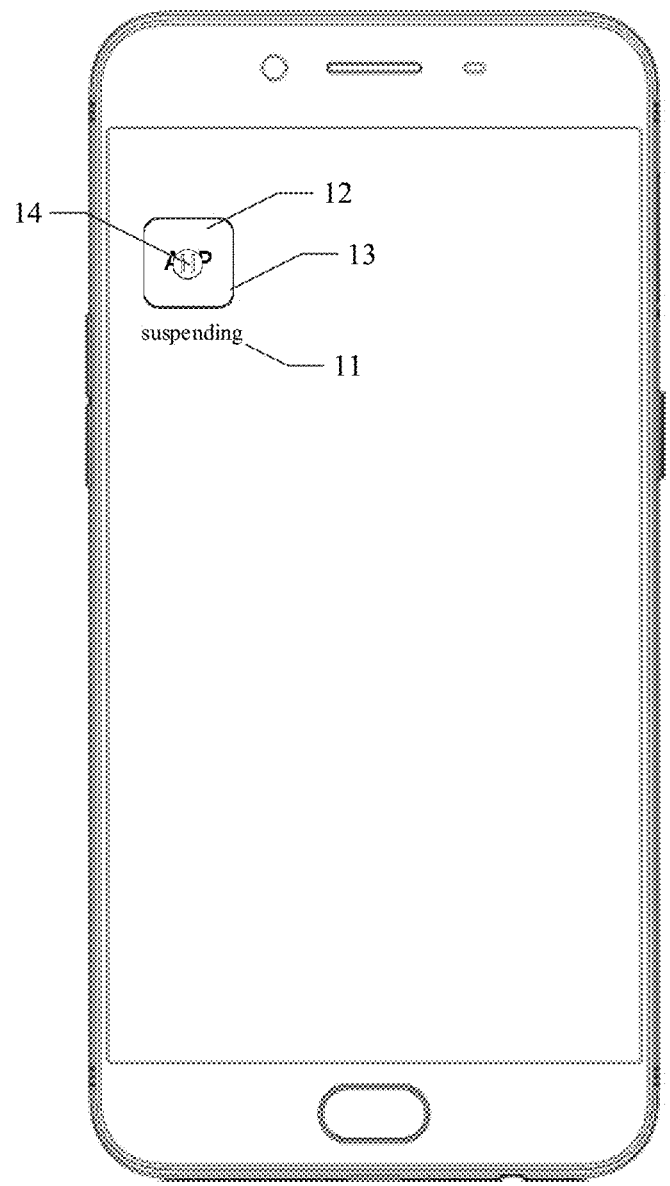
FIG. 6 is a schematic diagram showing an application icon after restarting a desktop process, when the application is suspended the download.

It should be added that if the downloading/installing status of the application is suspending download, the desktop process restarts, then the icon 13 and the translucent mask 12 displayed by the desktop process are shown as FIG. 6, due to that the download of the application is suspended and the system application process does not transmit the download progress of the application to the desktop process, and the area of the translucent mask 12 is equal to the area of the icon 13.

In one embodiment, after the terminal displays the icon of the application on the system desktop, the terminal further performs the following steps.

1. A drag operation signal corresponding to the icon of the application is acquired.

The desktop process acquires the drag operation signal corresponding to the icon of the application. In one embodiment, the desktop process enters the icon editing mode after obtaining a long press operation signal corresponding to the system desktop. In the icon editing mode, the user can drag and delete the icon of the application. For example, the user can drag one icon from a location on the system desktop to another location on the system desktop, and the user can also drag the icon into a desktop folder.

2. The icon of the application is added into the desktop folder according to the drag operation signal.

The desktop process adds the icon of the application into the desktop folder according to the drag operation signal. The desktop folder is the folder displayed on the system desktop, and allows to store multiple icons of applications in it.

3. A translucent mask corresponding to the download progress of the application is displayed on the upper layer of the icon of the desktop folder.

After the icon of the application is added into the desktop folder, if the desktop folder is closed, the desktop process displays a translucent mask corresponding to the download progress of the application on the upper layer of the icon of the desktop folder. In this way, the user can view the download progress of the application in the desktop folder.

Figure 7:
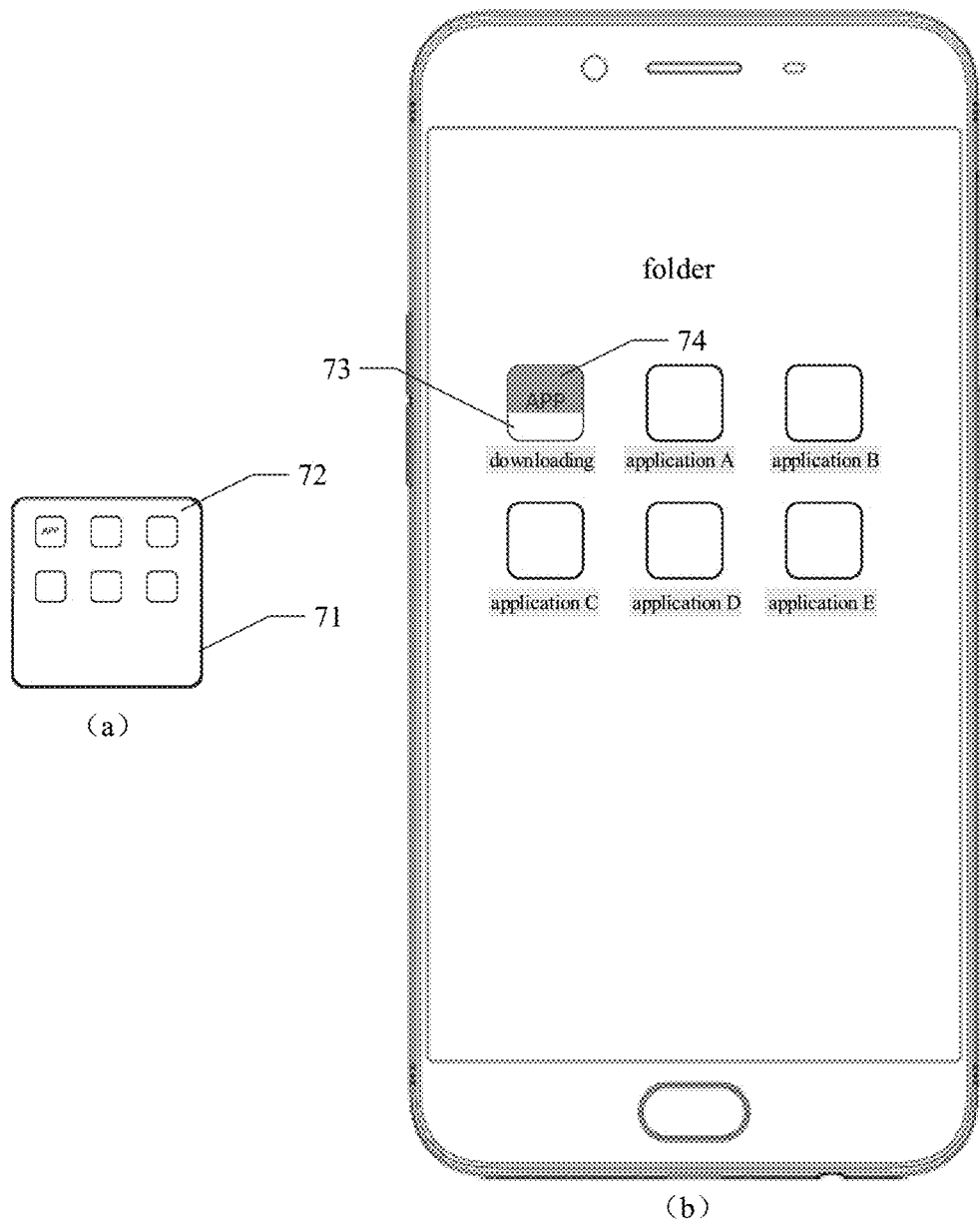
FIG. 7 is a schematic diagram showing a desktop folder in an open and closed state.

Referring to FIG. 7, part (a) of FIG. 7 shows that a translucent mask 72 corresponding to the download progress of the application is displayed on the upper layer of the icon 71 of the desktop folder, in the case where the desktop folder is in a closed state; part (b) of FIG. 7 shows a translucent mask 74 displayed on the upper layer of the icon 73 of the application corresponding to the download progress of the application, in the case where the desktop folder is in an open state.

In addition, during the process of dragging the icon, the desktop process pauses to change the area of the translucent mask that appears above the icon of the application. After the dragging is over, the desktop process displays the translucent mask corresponding to the current download progress of the application above the icon of the application.

In one embodiment, when the application is installed through the local installation package, at the beginning of installation, the desktop process displays the icon of the application on the system desktop, displays the translucent mask above the icon of the application, controls the area of the translucent mask to be reduced from 100% to a % within a preset time length at a constant rate, and displays the status of the application is installing in progress around the icon of the application. Wherein the value of a can be obtained according to practical experience, such as a=18, or 20, or 24, or the like. The value of the preset time length can be obtained based on actual experience, for example, 10 seconds. When the status of the application is completing installation, the desktop process controls the area of the translucent mask to be reduced from a % to zero.

In addition, if the application is installed within the preset time length, the area of the translucent mask is quickly reduced to zero at the moment the application is completed the installation, and the icon of the application is fully appeared and displayed. For example, if the application is installed within the preset time length, the area of the translucent mask is reduced to zero within 1 second or 0.5 seconds from the moment the application is completed the installation, and the icon of the application is fully appeared and displayed.

In one embodiment, for the same application, if the task for downloading the application is created in at least two system distributed applications, the system application process corresponding to each system distributed application provides the relevant information of the application to the desktop process. The relevant information includes the package name, the source, the icon storage path, the download progress, and the downloading/installing status of the application. The desktop process displays the icon of the application, the translucent mask, and the download progress on the system desktop according to the relevant information provided by the system application process that firstly creates the task for downloading. That is, the relevant information that first acquired is displayed.

For example, the application A is downloaded first from a software store, and when the download of the application A is not completed, the application A is downloaded again from a game center, then the desktop process just displays the download progress and the status of the application A in the software store.

For another example, the application B is downloaded from the game center, and when the download of the application B is not completed, the application B is downloaded again from the software store, then the desktop process just displays the download progress and the status of the application B in the game center.

When the desktop process receives the status of the application from any system application process is installing in progress, the status of the application displayed by the desktop process is changed to installing in progress. In one embodiment, if the application installation fails, the relevant information of the application is obtained from the system application process, and the icon of the application, the translucent mask, and the download installation progress are displayed according to the re-acquired relevant information of the application.

In addition, in the embodiment of the disclosure, the application being downloaded and installed from the system distributed application is supported, and the application being installed through the local installation package is also supported. There may be some conflicts in the above two situations, and the disclosure provides solution mechanism as follows.

1. For a particular application, it is installed firstly through the local installation package of the application, if it fails then downloads the installation package through the system distributed application (such as a software store or a game center).

The solution mechanism provided for the above situation is: when the application starts to install through the local installation package, the desktop process displays the icon of the application on the system desktop, and displays the status of the application is installing in progress. The desktop process just receives but does not display the relevant information transmitted form the system application process. If the application fails to install through the local installation package, the desktop process displays the icon of the application, the translucent mask, and download installation progress according to the relevant information of the application received from the system application process.

2. For a particular application, it is installed firstly through the local installation package of the application, wherein the local installation package is an old version, if it fails then downloads a new version of the installation package through the system distributed application (such as a software store or a game center).

The solution mechanism provided for the above situation is: when the application starts to install through the local installation package, the desktop process displays the icon of the application on the system desktop, and displays that the status of the application is installing in progress. The desktop process just receives but does not display the relevant information transmitted form the system application process. After the application is installed through the local installation package, the desktop process displays the icon of the application, the translucent mask, and the download installation progress according to the relevant information of the application received from the system application process. For example, the icon of the application is replaced by the new version, the download progress and the status are displayed as the application is being updated.

3. For a particular application, it is downloaded firstly through the system distributed application (such as a software store or a game center), and then it is installed through the local installation package of the application during the download process or the installation process.

The solution mechanism provided for the above situation is: the local installation package is not allowed to be installed, and the desktop process still displays the icon of the application, the translucent mask, and the download installation progress according to the relevant information of the application received from the system application process.

One point that needs to be noted is, during the download process and the installation process, if the task for downloading the application is deleted or an abnormality occurs, causing that the download and the installation fails, then the system application process promptly notifies the desktop process to delete the icon of the application. After the desktop process deleting the icon of the application, the remaining icons of the applications are automatically arranged to fill the gap.

Another point that needs to be noted is, during the download process, if the task for downloading the application is terminated due to an abnormality, meanwhile the desktop process does not obtain the status of the application being suspending download from the system application process, a timeout checking mechanism may be introduced in the desktop process. If the desktop process detects that the status of a particular application is downloading in progress, but the download progress has exceeded the preset threshold, the status of the application is changed from downloading in progress to suspending download, and the animation of the translucent mask is stopped to refresh. The preset threshold may be a preset time-related empirical value, such as 5 seconds.

Still another point that needs to be noted is, during the download process, the data in the desktop database may be cleared during. For the above situation, the system application process writes the relevant information of the application to the desktop database, if the information item in the desktop database is disappeared, the information item of the application is re-created, so that the desktop process can re-read and display the relevant information of the application from the desktop database. In one embodiment, the system application process carries the icon storage path of the application in every time of transmitting the relevant information of the application, to ensure that the desktop process can obtain the icon of the application and display it at any time.

It should also be added that, for a particular application, if the application has several icons, for example, the several icons respectively correspond to different functions of the application, then during the download process, the desktop process simultaneously displays translucent masks corresponding to the download progress of the application above icons of the application, respectively, and the status of the application is synchronously displayed around each icon of the application.

In addition, for a particular application that does not display its icon on the system desktop, during the download process or the updating process of the application, the desktop process does not display the icon of the application in the system desktop, and of course, the status of the application is not displayed in the system desktop.

It should also be noted that, when downloading or updating the system distributed application, the downloading/installing status about the system distributed application may not be displayed in the system desktop.

It should also be noted that, in the above method embodiments, the steps on the side of the system application process can be separately implemented as the information display method on the system application process side, and the steps on the side of the desktop process can be separately implemented as the information display method on the desktop process side.

The following are device embodiments of the disclosure, which are configured to implement the method embodiments of the disclosure. For details not disclosed in the device embodiments below, please refer to the method embodiments as stated above.

Figure 8:
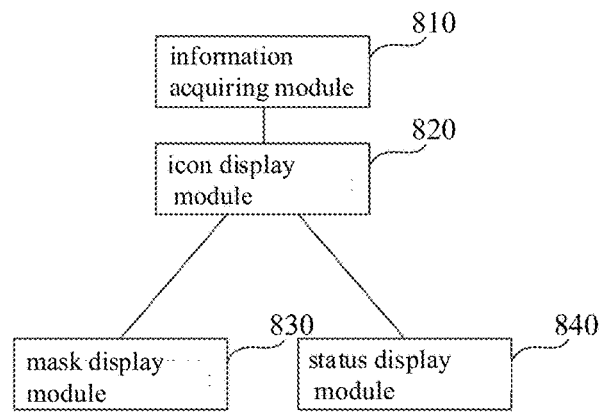
FIG. 8 is a block diagram of an information display device according to an embodiment of the disclosure.

Please refer to FIG. 8, which is a block diagram of an information display device provided by an embodiment of the disclosure. The device has functions of implementing an example of a method of the desktop process side described above, and the functions may be implemented by hardware, or may be implemented by executing corresponding software through hardware. The device may include an information acquiring module 810, an icon display module 820, a mask display module 830, and a status display module 840.

The information acquiring module 810, is configured to acquire relevant information of an application, wherein the relevant information of the application includes an icon storage path, a downloading progress, and a downloading/installing status of the application.

The icon display module 820, is configured to acquire an icon of the application based on the icon storage path and display the icon of the application on a system desktop.

The mask display module 830, is configured to display a translucent mask corresponding to the download progress of the application on an upper layer of the icon of the application.

The status display module 840, is configured to display the downloading/installing status of the application around the icon of the application.

In an optional embodiment based on the embodiment as shown in FIG. 8, the mask display module includes an area determining unit and a mask display unit.

The area determining unit is configured to determine an area of the translucent mask according to the download progress of the application. The area of the translucent mask is inversely related to the download progress of the application. When the download progress of the application is 0%, the area of the translucent mask is equal to the area of the icon of the application. When the download progress of the application is 100%, the area of the translucent mask is a % of the area of the icon, where 0<a<100.

The mask display unit is configured to display the translucent mask on the upper layer of the icon of the application according to the area of the translucent mask.

In another optional embodiment based on the embodiment as shown in FIG. 8, the mask display module is further configured to display the translucent mask with a preset size on the upper layer of the icon of the application, and the area of the translucent mask of the preset size is a % of the area of the icon of the application, when the downloading/installing status is installing in progress.

The mask display module is further configured to control the area of the translucent mask to be reduced from a % to zero, when the downloading/installing status is completing installation.

In another optional embodiment based on the embodiment as shown in FIG. 8, the icon display module includes a location acquiring unit, an application icon display unit, and a virtual icon display unit.

The location acquiring unit is configured to acquire the icon storage path of the application.

The application icon display unit is configured to display the icon of the application on the system desktop if the icon of the application is acquired according to the icon storage path of the application within a preset time.

The virtual icon display unit is configured to display a preset virtual icon on the system desktop if the icon of the application is not obtained according to the icon storage path of the application within the preset time, the preset virtual icon is used to replace the icon of the application.

In another optional embodiment based on the embodiment as shown in FIG. 8, the device further includes a suspending download module and a starting download module.

The suspending download module is configured to suspend the download of the application, when the downloading/installing status of the application is downloading in progress, and a first operation signal corresponding to the icon of the application is acquired. The downloading/installing status of the application is changed from downloading in progress to suspending download, a startup download control is displayed on an upper layer of the translucent mask, and the startup download control refers to an operation control for triggering the startup of the download about the application.

The starting download module is configured to start the download of the application, when the downloading/installing status of the application is suspending download and a second operation signal corresponding to the startup download control is acquired. The downloading/installing status of the application is changed from suspending download to downloading in progress.

In another optional embodiment based on the embodiment as shown in FIG. 8, the device further includes a first popup window module, which is configured to display a first popup window on the system desktop, when detecting that the currently accessed network is the mobile data network. Wherein the first popup window includes a first prompt information, a first operation control, and a second operation control. The first prompt information is configured to remind that the currently accessed network is a mobile data network, the first operation control is configured to trigger the download of the application through the mobile data network, and the second operation control is configured to trigger the download of the application when accessing the wireless local area network.

In another optional embodiment based on the embodiment as shown in FIG. 8, the device further includes a second popup window module, which is configured to displays a second popup window on the system desktop, when detecting that a remaining storage space is insufficient. The second popup window includes a second prompt information, a third operation control, and a fourth operation control. The second prompt information is configured to remind that the remaining storage space is insufficient, the third operation control is configured to trigger the cleaning of the storage space, and the fourth operation control is configured to trigger the cancellation of the cleaning of the storage space.

In another optional embodiment based on the embodiment as shown in FIG. 8, the device further includes a signal acquiring module and an icon moving module.

The signal acquiring module is configured to acquire a drag operation signal corresponding to the icon of the application.

The icon moving module is configured to moving the icon of the application into a desktop folder according to the drag operation signal.

The mask display unit is further configured to display a translucent mask corresponding to the download progress of the application on the upper layer of the icon of the desktop folder.

In another optional embodiment based on the embodiment as shown in FIG. 8, the device further includes a download cancelling module, which is configured to delete the icon of the application and cancel the download of the application, when the download of the application is not completed and a delete operation signal is acquired corresponding to the icon of the application.

In another optional embodiment based on the embodiment as shown in FIG. 8, the device further includes an information acquiring module, which is configured to acquire the relevant information provided by each system distributed application, when the task for downloading the application is created in at least two system distributed applications. The relevant information includes the package name, the download progress, and the downloading/installing status of the application, and the relevant information that firstly acquired is displayed.

In another optional embodiment based on the embodiment as shown in FIG. 8, the information acquiring module is configured to read the relevant information of the application written by the system application process from a desktop database; or obtain the relevant information of the application sent by the system application process via a broadcast manner.

In another optional embodiment based on the embodiment as shown in FIG. 8, the device further includes an indication message generating module and an indication message transmitting module.

The indication message generating module is configured to generate indication messages according to operation signals corresponding to the icon of the application, where the indication messages are used to instruct the system application process to change the downloading/installing status of the application.

The indication message transmitting module is configured to transmit the indication messages to the system application process.

In an embodiment, the indication message transmitting module is configured to: invokes a preset interface provided by the system application process, and transmits the indication messages to the system application process through the preset interface.

In an embodiment, the indication message transmitting module is configured to: generate a suspending indication message, which is configured to instruct to suspend the download of the application, when the downloading/installing status of the application is downloading in progress and a first operation signal corresponding to the icon of the application is acquired; or, generate a startup indication message, which is configured to start the download of the application, when the downloading/installing status of the application is suspending download and a second operation signal corresponding to the startup download control is acquired; or, generate a cancel indication message, which is configured to instruct to cancel the download of the application, when the download of the application is not completed and a delete operation signal corresponding to the icon of the application is acquired.

Figure 9:
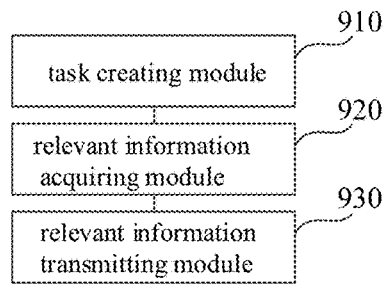
FIG. 9 is a block diagram of an information display device according to another embodiment of the disclosure.

Please refer to FIG. 9, which is a block diagram of an information display device provided by another embodiment of the disclosure. The device has functions of implementing an example of a method of the system application process side described above, and the functions may be implemented by hardware, or may be implemented by executing corresponding software through hardware. The device may include a task creating module 910, a relevant information acquiring module 920 and a relevant information transmitting module 930.

The task creating module 910 is configured to create tasks of downloading or updating an application.

The relevant information acquiring module 920 is configured to acquire relevant information of the application, wherein the relevant information of the application includes a package name, an icon storage path, a downloading progress, and a downloading/installing status of the application.

The relevant information transmitting module 930 is configured to transmit the relevant information of the application to a desktop process, wherein the desktop process is configured to acquire the icon of the application based on the icon storage path, display the icon of the application on a system desktop, display a translucent mask corresponding to the download progress of the application on an upper layer of the icon of the application, and display the downloading/installing status of the application around the icon of the application.

In an optional embodiment based on the embodiment as shown in FIG. 9, the relevant information transmitting module is configured to: write the relevant information of the application into a desktop database, where the desktop process is used to read the relevant information of the application from the database; or transmit the relevant information of the application to the desktop process via a broadcast manner.

In another optional embodiment based on the embodiment as shown in FIG. 9, the device further includes an indication message receiving module and a status changing module.

The indication message receiving module is configured to receive indication messages sent by the desktop process, where the indication messages are used to indicate the changes of the status of the application.

The status changing module is configured to change the status of the application according to the indication messages.

In another optional embodiment based on the embodiment as shown in FIG. 9, the indication messages receiving module is configured to: receive the indication messages sent by the desktop process by calling a preset interface; or receive the indication messages sent by the desktop process via a broadcast manner.

In another optional embodiment based on the embodiment as shown in FIG. 9, the device further includes a first indication transmitting module.

The first indication transmitting module is configured to transmit a first popup window indication to the desktop process, when detecting that the currently accessed network is the mobile data network. The desktop process is configured to display a first popup window on the system desktop, according to the first popup window indication.

The first popup window includes a first prompt information, a first operation control, and a second operation control. The first prompt information is configured to remind that the currently accessed network is a mobile data network, the first operation control is configured to trigger the download of the application through the mobile data network, and the second operation control is configured to trigger the download of the application when accessing the wireless local area network.

In another optional embodiment based on the embodiment as shown in FIG. 9, the device further includes a second indication transmitting module.

The second indication transmitting module is configured to transmit a second popup window indication to the desktop process, when detecting that a remaining storage space is insufficient. The desktop process is configured to display a second popup window on the system desktop, according to the second popup window indication.

The second popup window includes a second prompt information, a third operation control, and a fourth operation control. The second prompt information is configured to remind that the remaining storage space is insufficient, the third operation control is configured to trigger the cleaning of the storage space, and the fourth operation control is configured to trigger the cancellation of the cleaning of the storage space.

It should be noted that, when the device provided by the foregoing embodiments implements its functions, the division of each functional module described above is just illustrated. In actual applications, the functions may be distributed and completed by different functional modules as needed. The initial structure of the device can be divided into different functional modules to perform all or part of the functions described above. In addition, the device and method embodiments provided in the foregoing embodiments are in the same concept, and the specific implementation processes are described in detail in the method embodiments, and details are not described herein again.

Figure 10:
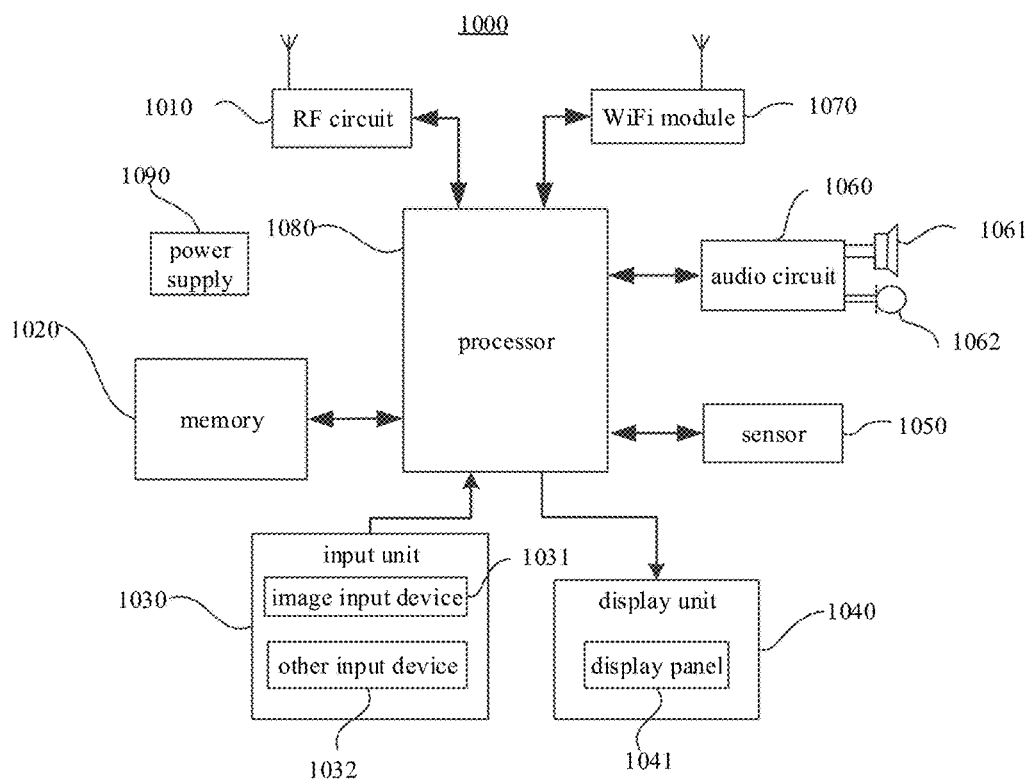
FIG. 10 is a schematic structural diagram of a terminal according to an embodiment of the disclosure.

Referring to FIG. 10, which is a schematic structural diagram of a terminal provided by an embodiment of the disclosure. The terminal is configured to implement the information display method provided in the above embodiments.

Specifically, the terminal 1000 may include a radio frequency (RF) circuit 1010, a memory 1020 having one or more computer readable storage media, an input unit 1030, a display unit 1040, a sensor 1050, an audio circuit 1060, a wireless fidelity (WiFi) module 1070, a processor 1080 having one or more processing cores, and a power supply 1090 and the like. It will be understood by those skilled in the art that the structure of the terminal as shown in FIG. 10 does not constitute a limitation to the terminal, and the terminal may include more or less components than those illustrated, or a combination of certain components, or different component arrangements.

The RF circuit 1010 can be used for transmitting and receiving messages, or transmitting and receiving signals during a call. Specifically, after receiving downlink information of a base station, the downlink information is processed by one or more processors 1080. In addition, the data related to the uplink is sent to the base station. Generally, the RF circuit 1010 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 1010 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 can be used to store software programs and modules, and the processor 1080 executes various functional applications and processing data by running software programs and modules stored in the memory 1020. The memory 1020 may mainly include a storage program area and a storage data area, wherein the storage program area may store an operating system, applications required for at least one function (such as a sound playing function, an image playing function, etc.), and the like. The storage data area may store the data created using the terminal (such as audio data, phone book, etc.). Moreover, the memory 1020 can include high speed random access memory, and can also include non-volatile memory, such as at least one magnetic disk storage device, flash memory device, or other volatile solid state storage device. Accordingly, the memory 1020 may also include a memory controller to provide the access to the memory 1020 by the processor 1080 and the input unit 1030.

The input unit 1030 can be used to receive input numeric or character information, as well as to generate signal inputs related to user settings and function controls, via a keyboard, a mouse, a joystick, optics or a trackball. In particular, in one particular embodiment, the input unit 1030 can include an image input device 1031 as well as other input devices 1032. The image input device 1031 can be a camera or other photoelectric scanning device. Specifically, other input devices 1032 may include, but are not limited to, one or more of a physical keyboard, function keys (such as volume control buttons, switch buttons, etc.), a trackball, a mouse, a joystick, and the like.

The display unit 1040 can be used to display information input by the user or information provided to the user, as well as various graphical user interfaces of the terminal 1000, which can be composed of graphics, text, icons, videos, and any combination thereof. The display unit 1040 can include a display panel 1041. Alternatively, the display panel can be configured in the form of a Liquid Crystal Display (LCD), an Organic Light-Emitting Diode (OLED), or the like.

The terminal also can include at least one type of the sensor 1050, such as a light sensor, a motion sensor, and other sensors. Specifically, the light sensor may include an ambient light sensor and a proximity sensor, wherein the ambient light sensor may adjust the brightness of the display panel 1041 according to the brightness of the ambient light, and the proximity sensor may close the display panel 1041 and/or the backlight when the terminal 1000 moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the terminal and are not detailed here.

The audio circuit 1060, a speaker 1061, and a microphone 1062 can provide an audio interface between the user and the terminal 1000. The audio circuit 1060 can convert the received audio data into electrical signals and transmit the electrical signals to the speaker 1061, the speaker 1061 converts the electrical signals into sound signals and output the sound signals. On the other hand, the microphone 1062 converts the collected sound signals into electrical signals, the electrical signals are received by the audio circuit 1060 and then converted into audio data, the audio data is then processed by the processor 1080, and then is sent to another terminal via the RF circuitry 1010, for example, or the audio data is output to memory 1020 for further processing. The audio circuit 1060 may also include an earbud jack to provide communication between the peripheral earphone and the terminal 1000.

WiFi is a short-range wireless transmission technology, and the terminal 1000 can help users to send and receive emails, browse web pages, and access streaming media through the WiFi module 1070, which provides wireless broadband internet access for users. Although FIG. 10 shows the WiFi module 1070, it can be understood that it is not the necessary configuration of the terminal, and may be omitted as needed within the scope of not changing the essence of the disclosure.

The processor 1080 is the control center of the terminal 1000, which connects various portions of the entire terminal using various interfaces and lines, by performing or executing software programs and/or modules stored in the memory 1020, and by invoking data stored in the memory 1020, thereby implementing the various functions of the terminal and processing data to monitor the terminal 1000. Optionally, the processor 1080 may include one or more processing cores. Optionally, the processor 1080 may integrate an application processor and a modem processor, where the application processor mainly processes the operating system, the user interfaces, the applications, and the like, and the modem processor primarily handles wireless communications. It will be appreciated that the above described modem processor may also not be integrated into the processor 1080.

The terminal also includes the power supply 1090 (such as a battery) that supplies power to the various components. Optionally, the power supply 1090 can be logically coupled to the processor 1080 through a power management system to manage functions such as charging, discharging, and power management through the power management system. The power supply 1090 may also include one or more of DC or AC power source, a recharging system, a power failure detection circuit, a power converter or inverter, a power status indicator, and the like.

In an exemplary embodiment, a non-transitory computer readable storage medium having instructions is also provided, such as a memory comprising instructions executable by a processor of a terminal to perform the various steps of the above method embodiments. For example, the non-transitory computer readable storage medium may be a read only memory (ROM), a random access memory (RAM), a CD-ROM, a magnetic disk, or an optical disk.

It should be understood that "several" as referred to herein means two or more. The relationship described as "and/or" indicates that there may be three relationships, for example, A and/or B, which may indicate that there are three cases where A exists separately, A and B exist at the same time, and B exists separately. The character "/" generally indicates that the contextual objects are in an "or" relationship.

The serial numbers of the embodiments of the disclosure are merely for the description, and do not represent the advantages and disadvantages of the embodiments.

The above description is only exemplary embodiments of the disclosure, and is not intended to limit the disclosure. Any modifications, equivalents, improvements, etc., within the spirit and principles of the disclosure are included in the scope of the claims of the disclosure.

What is claimed is:

1. An information display method, applied to a terminal, comprising:
    a system application process creating a task of downloading or updating an application, wherein the task of downloading or updating an application refers to a task created in a system application to download and install the application, and the system application refers to an application for displaying and downloading applications applicable to the terminal;
    the system application process acquiring relevant information of the application, wherein the relevant information of the application comprises a package name, an icon storage path, a downloading progress, and a downloading/installing status of the application;
    the system application process transmitting the relevant information of the application to a desktop process;
    the desktop process acquiring an icon of the application based on the icon storage path;
    the desktop process acquiring the icon storage path of the application;
    the desktop process displaying the icon of the application on a system desktop when the icon of the application is acquired within a predetermined time;
    the desktop process displaying a virtual icon on the system desktop when the icon of the application fails to be acquired within the predetermined time, wherein the virtual icon is configured to replace the icon of the application, the virtual icon being a preset icon with boundaries and without content therein;
    the desktop process displaying a translucent mask corresponding to the download progress of the application on an upper layer of the icon of the application; and
    the desktop process displaying the downloading/installing status of the application around the icon of the application.

2. The method according to claim 1, wherein the system application process transmitting the relevant information of the application to a desktop process comprises:
    the system application process writing the relevant information of the application in a desktop database, and the desktop process reading the relevant information of the application from the desktop database.

3. The method according to claim 2, after the desktop process acquiring an icon of the application based on the icon storage path, and displaying the icon of the application on a system desktop, the method further comprising:
    the desktop process generating indication messages according to operation signals corresponding to the icon of the application, wherein the indication messages are configured to instruct the system application process to change the downloading/installing status of the application;
    the desktop process transmitting the indication messages to the system application process; and
    the system application process changing the downloading/installing status of the application according to the indication messages.

4. The method according to claim 3, after the desktop process acquiring an icon of the application based on the icon storage path, and displaying the icon of the application on a system desktop, the method further comprising:
    the desktop process invoking a preset interface provided by the system application process, and transmitting the indication messages to the system application process via the preset interface; or
    the desktop process transmitting the indication messages to the system application process via a broadcast manner.

5. The method according to claim 1, wherein the desktop process displaying a translucent mask corresponding to the download progress of the application on an upper layer of the icon of the application comprises:
    determining an area of the translucent mask according to the download progress of the application, wherein the area of the translucent mask is inversely related to the download progress of the application, when the download progress of the application is 0%, the area of the translucent mask is equal to the area of the icon of the application, when the download progress of the application is 100%, the area of the translucent mask is a % of the area of the icon, 0<a<100;
   displaying the translucent mask on the upper layer of the icon of the application, according to the area of the translucent mask.

6. The method according to claim 5, further comprising:
   the desktop process displaying the translucent mask with a preset size on the upper layer of the icon of the application when the downloading/installing status of the application is installing in progress, wherein the area of the translucent mask with the preset size is a % of the area of the icon;
   the desktop process controlling the area of the translucent mask reducing from a % to zero when the downloading/installing status of the application is completing installation.

7. The method according to claim 1, further comprising:
   the desktop process suspending the download of the application when a first operation signal is received during the process of downloading the application, changing the downloading/installing status of the application from downloading to suspending, displaying a startup download control on the upper layer of the translucent mask, the startup download control being configured for triggering the startup of the download of the application;
   the desktop process starting the download of the application when a second operation signal is received during the process of suspending the application, changing the downloading/installing status of the application from suspending to downloading.

8. The method according to claim 1, further comprising:
   the desktop process displaying a first popup window on the system desktop when detecting that the currently accessed network is a mobile data network;
   wherein the first popup window comprises a first prompt information, a first operation control, and a second operation control, the first prompt information is configured to remind that the currently accessed network is a mobile data network, the first operation control is configured to trigger the download of the application through the mobile data network, and the second operation control is configured to trigger the download of the application when accessing a wireless local area network.

9. The method according to claim 1, further comprising:
   the desktop process displaying a second popup window on the system desktop when detecting that a remaining storage space is insufficient;
   wherein the second popup window comprises a second prompt information, a third operation control, and a fourth operation control, the second prompt information is configured to remind that the remaining storage space is insufficient, the third operation control is configured to trigger the cleaning of the storage space, and the fourth operation control is configured to trigger the cancellation of the cleaning of the storage space.

10. The method according to claim 1, after displaying the icon of the application on a system desktop, the method further comprising:
   the desktop process acquiring a drag operation signal corresponding to the icon of the application;
   the desktop process moving the icon of the application to a desktop folder according to the drag operation signal;
   the desktop process displaying the translucent mask corresponding to the download progress of the application on an upper layer of the icon of the desktop folder.

11. The method according to claim 1, after displaying the icon of the application on a system desktop, the method further comprising:
   the desktop process deleting the icon of the application from the system desktop and cancelling the download of the application, when the download of the application is not completed and a delete operation signal corresponding to the icon of the application is acquired.

12. The method according to claim 1, further comprising:
   the desktop process acquiring the relevant information provided by each system distributed application when tasks for downloading or updating the application are created in at least two system distributed applications;
   wherein the relevant information comprises the icon, the download progress, and the downloading/installing status of the application, the relevant information firstly acquired is displayed.

13. An information display method, comprising:
   creating a task for downloading or updating an application;
   acquiring relevant information of the application, wherein the relevant information of the application comprises a package name, an icon storage path, a downloading progress, and a downloading/installing status of the application;
   transmitting the relevant information of the application to a desktop process, wherein the desktop process is configured to acquire the icon of the application based on the icon storage path, display the icon of the application on a system desktop, display a translucent mask corresponding to the download progress of the application on an upper layer of the icon of the application, and display the downloading/installing status of the application around the icon of the application;
   wherein the operation of displaying the icon of the application on a system desktop comprises:
      the desktop process acquiring the icon storage path of the application;
      the desktop process displaying the icon of the application on the system desktop when the icon of the application is acquired within a predetermined time; and
      the desktop process displaying a virtual icon on the system desktop when the icon of the application fails to be acquired within the predetermined time, wherein the virtual icon is configured to replace the icon of the application, the virtual icon being a preset icon with boundaries and without content therein.

14. The method according to claim 13, wherein transmitting the relevant information of the application to a desktop process comprises:
   transmitting the relevant information of the application to the desktop process via a broadcast manner.

15. The method according to claim 13, after transmitting the relevant information of the application to a desktop process, the method further comprising:
   receiving indication messages transmitted from the desktop process, the indication messages being configured to instruct the downloading/installing status of the application;
   changing the downloading/installing status of the application according to the indication messages.

16. The method according to claim 15, wherein receiving indication messages transmitted from the desktop process comprises:

receiving the indication messages transmitted from the desktop process via invoking a predetermined interface; or receiving the indication messages transmitted from the desktop process via a broadcasting manner.

17. The method according to claim 15, further comprising:

transmitting a first popup window indication to the system desktop when detecting that the currently accessed network is a mobile data network, the first popup window indication being configured to display a first popup window on the system desktop according to the first popup window indication;

wherein the first popup window comprises a first prompt information, a first operation control, and a second operation control, the first prompt information is configured to remind that the currently accessed network is a mobile data network, the first operation control is configured to trigger the download of the application through the mobile data network, and the second operation control is configured to trigger the download of the application when accessing a wireless local area network.

18. The method according to claim 15, further comprising:

transmitting a second popup window indication to the system desktop when detecting that a remaining storage space is insufficient, the second popup window indication being configured to display a second popup window on the system desktop according to the second popup window indication;

wherein the second popup window comprises a second prompt information, a third operation control, and a fourth operation control, the second prompt information is configured to remind that the remaining storage space is insufficient, the third operation control is configured to trigger the cleaning of the storage space, and the fourth operation control is configured to trigger the cancellation of the cleaning of the storage space.

19. A terminal, comprising:

one or more processors; and a memory;

wherein the memory has one or more programs stored therein, the one or more programs are configured to be executed by the one or more processors, the one or more programs comprises instructions for performing the operations of:

acquiring relevant information of an application, wherein the relevant information of the application comprises an icon storage path, a downloading progress, and a downloading/installing status of the application;

acquiring an icon of the application based on the icon storage path;

displaying the icon of the application on a system desktop when the icon of the application is acquired within a predetermined time;

displaying a virtual icon on the system desktop when the icon of the application fails to be acquired within the predetermined time, wherein the virtual icon is configured to replace the icon of the application, the virtual icon being a preset icon with boundaries and without content therein;

displaying a translucent mask corresponding to the download progress of the application on an upper layer of the icon of the application; and displaying the downloading/installing status of the application around the icon of the application.

* * * * *